United States Patent
Lim et al.

(10) Patent No.: US 9,544,584 B2
(45) Date of Patent: Jan. 10, 2017

(54) METHOD AND APPARATUS FOR ENCODING/DECODING VIDEO USING BIDIRECTIONAL INTRA PREDICTION

(71) Applicant: SK TELECOM CO., LTD., Seoul (KR)

(72) Inventors: Jeongyeon Lim, Seongnam-si (KR); Jongki Han, Seoul (KR); Yunglyul Lee, Seoul (KR); Joohee Moon, Seoul (KR); Haekwang Kim, Seoul (KR); Byeungwoo Jeon, Seongnam-si (KR); Chanwon Seo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 728 days.

(21) Appl. No.: 13/942,193

(22) Filed: Jul. 15, 2013

(65) Prior Publication Data
US 2013/0301709 A1    Nov. 14, 2013

Related U.S. Application Data

(63) Continuation of application No. PCT/KR2012/000360, filed on Jan. 16, 2012.

(30) Foreign Application Priority Data

Jan. 15, 2011  (KR) .................. 10-2011-0004303

(51) Int. Cl.
| H04N 7/26 | (2006.01) |
| H04N 7/32 | (2006.01) |
| H04N 19/105 | (2014.01) |
| H04N 19/176 | (2014.01) |
| H04N 19/11 | (2014.01) |

(52) U.S. Cl.
CPC ...... *H04N 19/00024* (2013.01); *H04N 19/105* (2014.11); *H04N 19/11* (2014.11); *H04N 19/176* (2014.11)

(58) Field of Classification Search
CPC ............ H04N 19/00024; H04N 19/105; H04N 19/176; H04N 19/11
USPC ...................................... 375/240.03, 240.02
See application file for complete search history.

(56) References Cited

U.S. PATENT DOCUMENTS

2012/0039388 A1*  2/2012  Kim .................. H04N 19/61
                                                      375/240.03

FOREIGN PATENT DOCUMENTS

| CN | 101409838 A | 4/2009 |
| CN | 101496406 A | 7/2009 |
| KR | 1020070096737 | 10/2007 |
| KR | 1020100018810 | 2/2010 |
| KR | 1020100113703 | 10/2010 |
| WO | 2007108640 A | 9/2007 |

OTHER PUBLICATIONS

International Search Report mailed Sep. 14, 2012 for PCT/KR2012/000360, citing the above reference(s).

\* cited by examiner

*Primary Examiner* — Hee-Yong Kim
(74) *Attorney, Agent, or Firm* — Hauptman Ham, LLP

(57) ABSTRACT

The present disclosure provides a method and apparatus for encoding and decoding a video. In particular, the apparatus for encoding a video includes an offset calculator to calculate an offset between pixels of neighboring blocks corresponding to an intra prediction direction; and a prediction unit to adaptively perform an intra prediction on a current (Continued)

block in consideration of the calculated offset so as to generate a predicted block, and to intra-predictively encode the current block.

14 Claims, 13 Drawing Sheets

METHOD AND APPARATUS FOR ENCODING/DECODING VIDEO USING BIDIRECTIONAL INTRA PREDICTION

CROSS-REFERENCE TO RELATED APPLICATION

The present application is a continuation of International Patent Application No. PCT/KR2012/000360, filed Jan. 16, 2012, which is based on and claims priority to Korean Patent Application No. 10-2011-0004303, filed on Jan. 15, 2011. The disclosures of the above-listed applications are hereby incorporated by reference herein in their entirety.

FIELD

The present disclosure relates to a method and apparatus for encoding/decoding a video using a bidirectional intra prediction, in which a bidirectional prediction and a unidirectional prediction are used for an adaptive intra prediction.

BACKGROUND

The statements in this section merely provide background information with relation to the present disclosure and may not constitute the prior art.

H.264/AVC is a standard for video codec with the best compression rate among the present standardized video CODECs. In the H.264/AVC standard, a video is predictably encoded using directional intra prediction, integer transform by 4×4 pixel, block mode with various sizes from 16×16 pixel block to 4×4 pixel block, deblocking filter, and the like in order to increase compression efficiency.

In High Efficiency Video Coding (HEVC), which is recently being standardized, intra predictions are carried out on blocks of sizes 4×4 to 16×16 and beyond in order to attain more efficient results than H.264/AVC. As shown in FIG. 1, the intra prediction can be performed in consideration of the maximum of thirty-four directions to predict a current block ever more precisely.

The known intra prediction methods perform a unidirectional prediction. The inventor(s) has, however, noted that where the current block has a significantly small size or only one feature, using information on a plurality of neighboring (or surrounding) pixels might increase the efficiency of predicting the current block. The inventor(s) has, however, experienced that in the known intra prediction, since only a simple unidirectional prediction is used, an improvement of an encoding efficiency is limited.

SUMMARY

In accordance with some embodiments, an apparatus for encoding a video comprises an offset calculator and a prediction unit. The offset calculator is configured to calculate an offset between pixels of neighboring blocks corresponding to an intra prediction direction. And the prediction unit is configured to adaptively perform an intra prediction on a current block in consideration of the calculated offset so as to generate a predicted block, and to intra-predictively encode the current block.

In accordance with some embodiments, an apparatus for decoding a video comprises a prediction information decoding unit, an offset calculator and an intra prediction decoding unit. The prediction information decoding unit is configured to decode prediction information including an intra prediction mode from a bitstream. The offset calculator is configured to calculate an offset between pixels of neighboring blocks corresponding to an intra prediction direction. And the intra prediction decoding unit is configured to perform an intra prediction on a current block in consideration of the calculated offset so as to generate a predicted block and reconstruct the current block.

DETAILED DESCRIPTION

The present disclosure provides an improved efficiency of an intra prediction by adaptively using a bidirectional prediction as well as a unidirectional prediction.

Hereinafter, at least one embodiment of the present disclosure will be described in detail with reference to the accompanying drawings. In the following description, a video encoding apparatus and/or a video decoding apparatus according to one or more embodiments may correspond to a user terminal (or a user equipment) such as a PC (personal computer), notebook computer, PDA (personal digital assistant), PMP (portable multimedia player), PSP (PlayStation Portable), wireless communication terminal, smart phone, TV, and the like, or a server terminal such as an application server, a service server, and the like. A video encoding apparatus and/or a video decoding apparatus according to one or more embodiments may correspond to various apparatuses each including a communication apparatus such as a communication modem and the like for performing communication with various types of devices or a wired/wireless communication networks, a memory for storing various programs and data that encode or decode a video or perform an inter/intra-prediction for encoding or decoding, and a microprocessor to execute a program so as to perform calculation and controlling, and the like.

Further, a video which is encoded to a bit stream by the video encoding apparatus can be transmitted in real time or non-real time to the video decoding apparatus through wired/wireless communication networks such as the Internet, a near field communication, a wireless LAN, a Wibro (aka WiMax) network, a mobile communication network, and the like, or various communication interfaces such as a cable, a USB (Universal Serial Bus), and the like, and in turn decoded by the video decoding apparatus so as to be reconstructed and reproduced as the video.

Typically, a video can be configured from a series of pictures, each of which can be divided into predetermined regions such as frames or blocks. Where a region of a video is divided into blocks, the divided blocks can be generally classified into intra blocks and inter blocks according to an encoding scheme. The intra blocks are encoded by using an intra prediction coding scheme, which uses pixels of reconstructed blocks which are formerly encoded and decoded in a present picture to predict pixels of a current block, thereby generating a prediction block and encoding a differential value between the pixels of the current block and the prediction block. The inter blocks are encoded by using an inter prediction coding scheme, which refers to at least one past picture or future picture to predict a current block in a present picture, thereby generating a prediction block and encoding a differential value between the current block and the prediction block. Here, a frame, which is used as a reference to encode or decode the current picture, is referred to as a reference frame.

Figure 2:
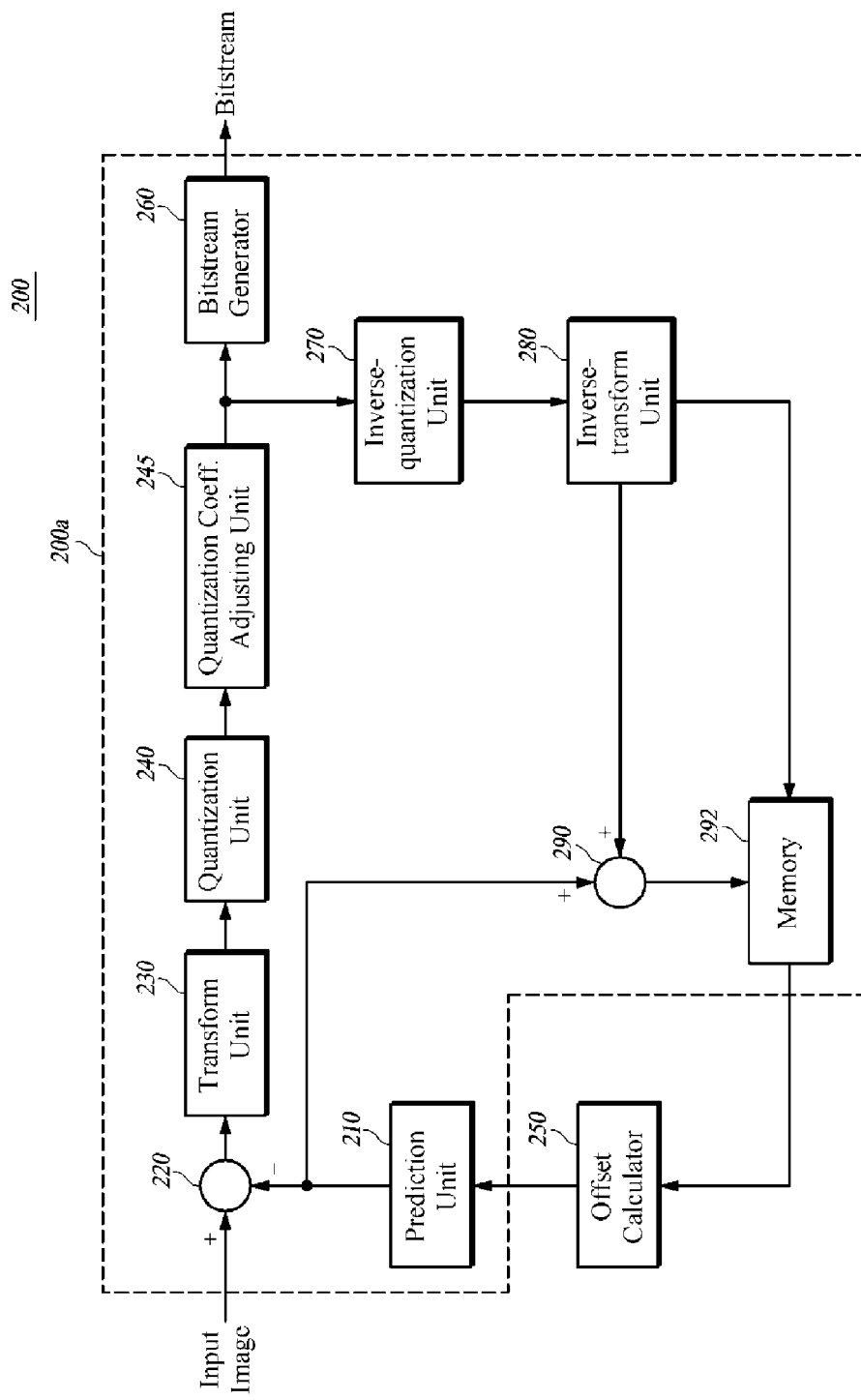
FIG. 2 is a schematic block diagram of a video encoding apparatus according to at least one embodiment of the present disclosure.

FIG. 2 is a schematic block diagram of a video encoding apparatus according to at least one embodiment of the present disclosure.

The video encoding apparatus 200 according to at least one embodiment of the present disclosure is an apparatus for encoding a video, which includes an intra prediction encoding unit 200a and an offset calculator 250. The intra prediction encoding unit 200a includes a prediction unit 210, a subtraction unit 220, a transform unit 230, a quantization unit 240, a quantization coefficient adjustment unit 245, a bitstream generator 260, an inverse quantization unit 270, an inverse transform unit 280, an addition unit 290 and a memory 292. The offset calculator 250 as well as other components of the intra prediction encoding unit 200a, such as the prediction unit 210, the subtraction unit 220, the transform unit 230, the quantization unit 240, the quantization coefficient adjustment unit 245, the bitstream generator 260, the inverse quantization unit 270, the inverse transform unit 280 and the addition unit 290 are implemented by one or more processors and/or application-specific integrated circuits (ASICs).

An input video to be encoded is input block by block, and a block of the input video has a form of M×N, in which an M and N respectively may have various sizes and be equal to or different from each other.

The offset calculator 250 calculates an offset between pixels of neighboring block corresponding to a direction of an intra prediction.

Figure 3:
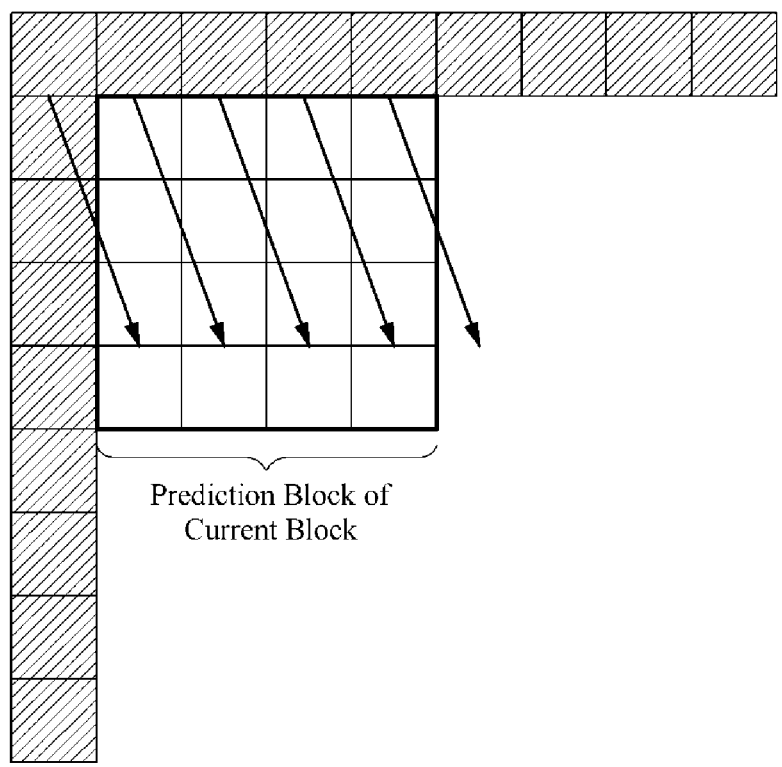
FIG. 3 is an exemplary view of a method of generating an intra prediction block, in which an intra prediction direction includes a downward orientation.
Figure 4A:
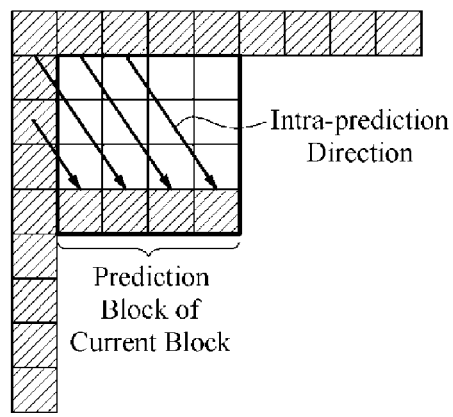
FIGS. 4A to 4C are exemplary views of a method of calculating an offset and generating a predicted line of a distal line for an intra prediction according to at least one embodiment of the present disclosure, in which an intra prediction direction includes a downward orientation.
Figure 4B:
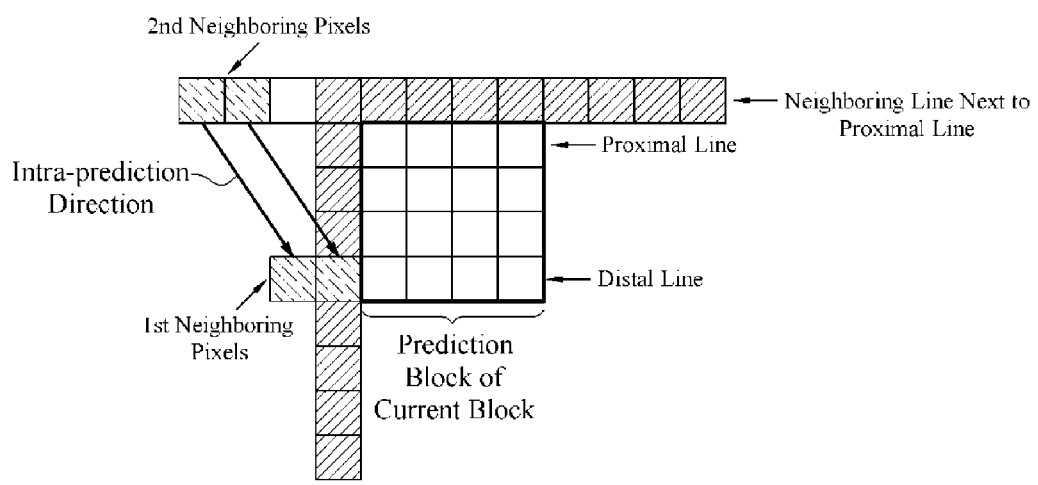
Figure 4C:
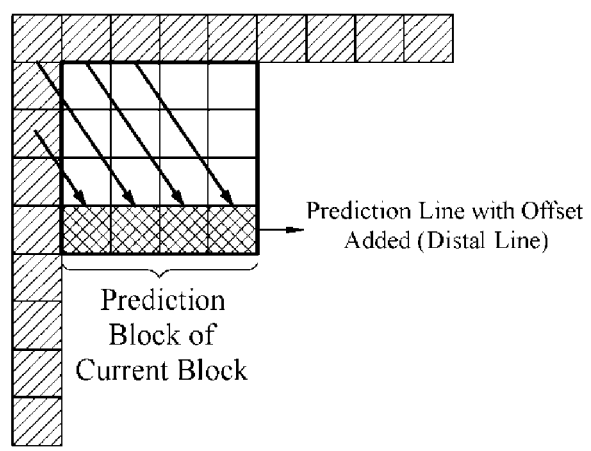

FIG. 3 is an exemplary view of generating an intra prediction block, in which an intra prediction direction includes a downward orientation, and FIGS. 4A to 4C are exemplary views of calculating the offset so as to generate the predicted block according to at least one embodiment of the present disclosure.

As shown in FIG. 3, the known intra prediction provides a calculation of a prediction pixel value according to an intra prediction mode by using values of previously encoded pixels which are adjacent to the above and left sides of the current block, and uses the calculated results as a predicted block for the current block.

In at least one embodiment of the present disclosure to the contrary as shown in FIGS. 4A to 4C, a newly provided intra prediction method reflects a calculated offset in the prediction pixel value according to the intra prediction mode to obtain a prediction pixel value reflecting the offset, and uses the latter as a predicted block for the current block.

Specifically, as illustrated in FIG. 4C, in the present intra prediction method, prediction pixel values of the lowest line in the current block are obtained for use by adding the calculated offset for the neighboring pixels to the known predicted pixel value according to the intra prediction mode.

As shown in FIG. 4C, where the intra prediction direction includes a downward orientation, a distal line of the current block refers to the lowest line of the current block, whereas a proximal line is farthest from the distal line in the current block and refers to the top end line of the current block as shown in FIG. 4B.

As illustrated in FIG. 4B, the offset calculator 250 selects first neighboring pixels located collinearly with pixels in the distal line of the current block when viewed in the direction of the intra prediction, and second neighboring pixels in a neighboring line next to the proximal line of the current block when viewed in the direction of the intra prediction, and then calculates an offset between the first and second neighboring pixels. Here, the selected first neighboring pixels may be pixels aligned with and inclusive of neighboring pixels in the distal line of the current block. Further, the second neighboring pixels may be pixels selected from current block's neighbor pixels and aligned with a line of neighboring reference pixel next to and in parallel with the proximal line. That is, the second neighboring pixels is located on an extension of a neighboring line, the neighboring line next to and parallel with a proximal line of the current block when viewed in the intra prediction direction. Furthermore, the first neighboring pixels and the second neighboring pixels may be collinear respectively when viewed in the intra prediction direction.

Figure 5A:
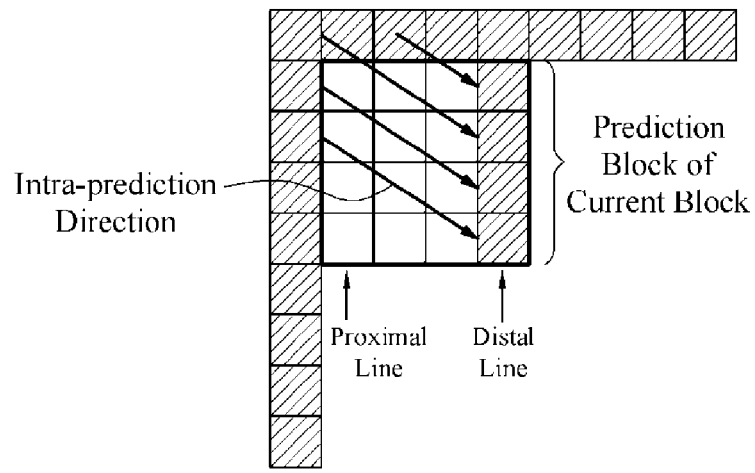
FIGS. 5A to 5C are exemplary views of a method of calculating an offset and generating a predicted line of a distal line for an intra prediction according to at least one embodiment of the present disclosure, in which an intra prediction direction includes an upward orientation.
Figure 5B:
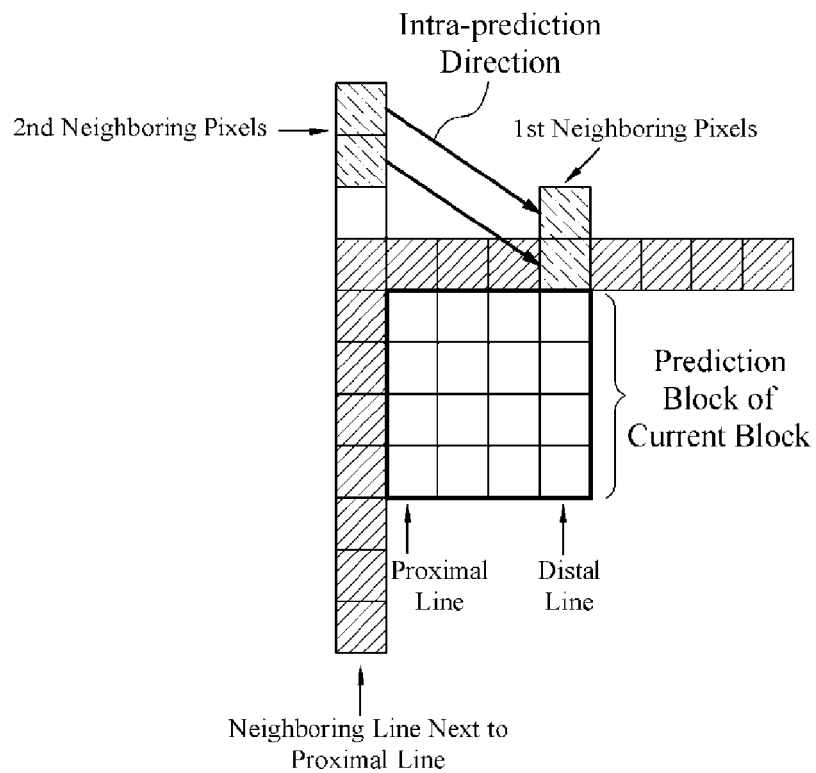
Figure 5C:
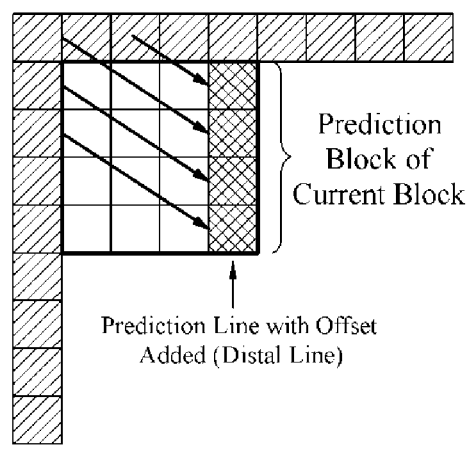

As shown in FIGS. 5A to 5C, where the intra prediction direction includes a horizontal orientation, the distal line of the current block refers to a rightmost line of the current block, whereas the proximal line is farthest from the distal line in the current block and refers to the leftmost line of the current block.

As shown in FIG. 5B, the offset calculator 250 selects first neighboring pixels located collinearly when viewed in the intra prediction direction with pixels in the distal line of the current block, and second neighboring pixels in a neighboring line next to the proximal line of the current block when viewed in the direction of the intra prediction, and then calculates an offset between the first and second neighboring pixels. Here, the selected first neighboring pixels may be vertically continuous pixels in a row including pixels adjacent to the distal line of the current block. Further, the second neighboring pixels may be selected pixels neighboring the current block and aligned with a line of neighboring reference pixel which is closest to and parallel with the proximal line.

On the other hand, the number of the first neighboring pixels may be one half of the side line length of the current block. For example, as shown in FIG. 4B for a 4×4 block, since the side length is four pixels long, the number of the first neighboring pixels becomes two. Further, in the method of calculating the offset, a difference is calculated between the selected first neighboring pixels and the selected second neighboring pixels, and then an average difference can be defined as the offset.

Figure 6:
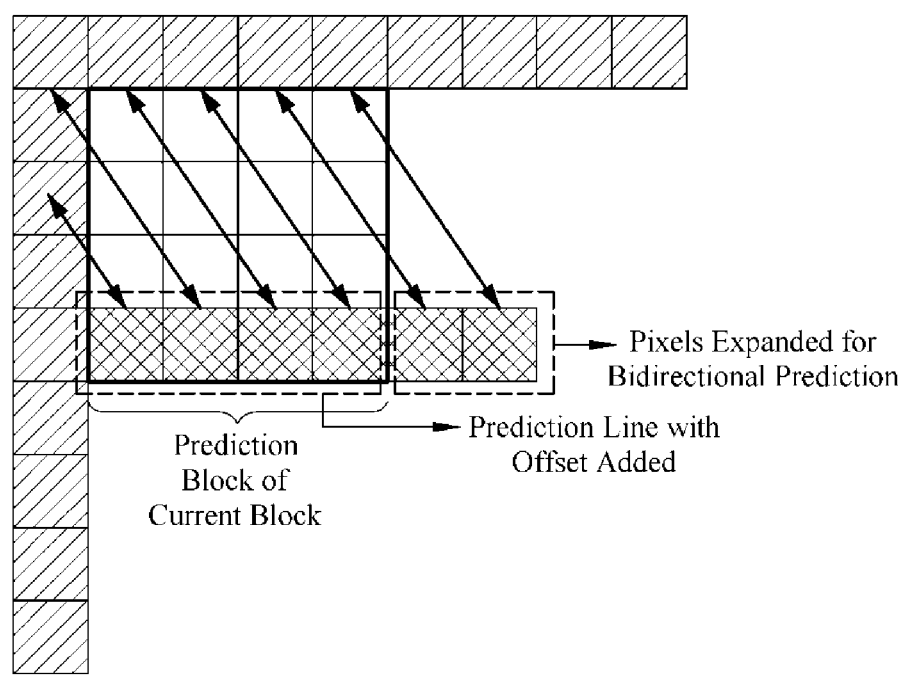
FIG. 6 is a view of a predicted block in which a bi-linear interpolation is carried out.

As shown in FIG. 4B, where the intra prediction direction starts from an upper left portion to a lower right portion, for a predicted pixel value of the lowest line which is the distal line, the prediction unit 210 does not use a net pixel value resulting from the intra prediction shown in FIG. 4A, but generates a predicted pixel value in consideration of the offset. In other words, the offset is added to the predicted pixel value generated according to a mode of the intra prediction toward a sum as a last line predicted value of a distally located line among the pixel lines of the current block. In this case, predicted pixel values of the remaining pixel lines except for the distally located line of pixels of the current block can be generated by performing a bilinear interpolation using the last line predicted value and related neighboring reference pixel values according to the intra prediction mode, thereby forming a predicted block as shown in FIG. 6.

On the other hand, if an absolute value of the offset is smaller than a first threshold value, the offset is set to zero so that the offset is not to be reflected in the predicted pixel value of the lowest end or distal line. Here, the first threshold value is set in various ways such as to $2^{B_{inc}}$ where $B_{inc}$ is a parameter set to use IBDI (Internal Bit Depth Increasing).

Furthermore, if the absolute value of the offset is larger than a second threshold value, the absolute value of the offset can be limited not to go over the second threshold value. For example, the second threshold value can be set to a value of 10 or others.

Here, the video encoding apparatus and the video decoding apparatus described below further include a threshold value generator (not shown) configured to generate information on the first and second threshold values. Upon receiving a delivery of the generated information on the first and second threshold values, bitstream generator 260 turns the information into a bitstream to transmit to the video decoding apparatus as described later. In addition, using a threshold value prearranged between the video encoding apparatus and the video decoding apparatus can avoid the need to transmit the first and second threshold value information.

Figure 7:
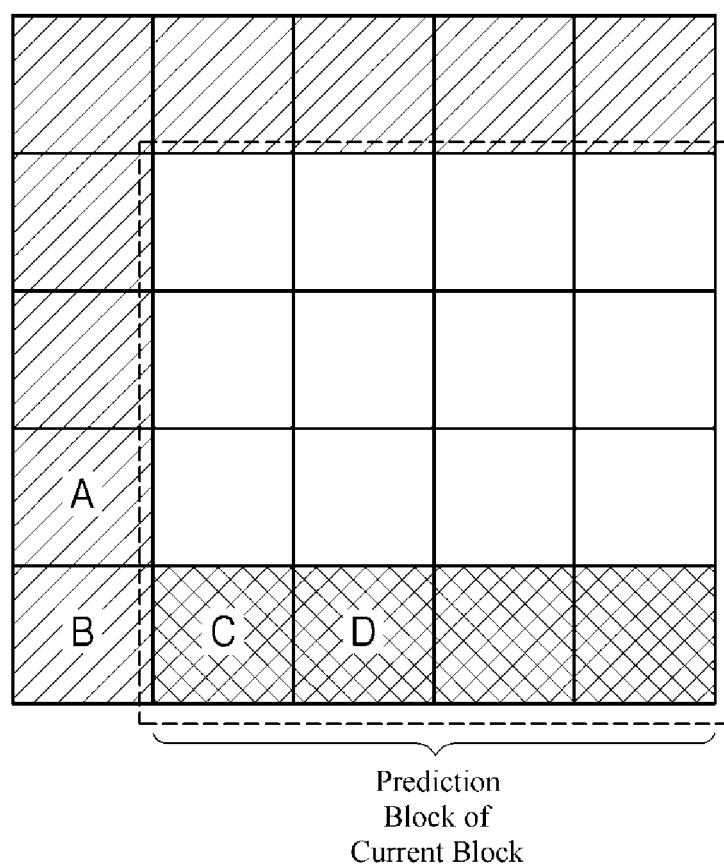
FIG. 7 is an exemplary view of a process of filtering predicted pixel values of the distal line and neighboring reference pixel values.

FIG. 7 is an exemplary view illustrating a process of filtering predicted pixel values and neighboring reference pixel values of the distal line.

As shown in FIG. 7, before the performing of the bi-linear interpolation, the predicted pixel values of the distal line with the offset reflected and the neighboring reference pixel values can be filtered and used as reference pixel values in order to calculate predicted pixel values of the current block. Specifically, the filtering is performed on one or more reference pixels of neighboring blocks of the distal line. At this time, the reference pixels of the neighboring blocks to be filtered may be pixels adjacent to the current block. Further, the number of the neighboring pixels to which the filtering is applied may be the same value as is prearranged with the video decoding apparatus.

As shown in FIG. 7, the pixels to be filtered may be B and C. For example, B and C respectively are filtered into B' and C' which are used to carry out a bi-linear interpolation.

$$B'=(A+2*B+C)/4$$

$$C'=(B+2*C+D)/4 \quad \text{Equation 1}$$

Figure 8:
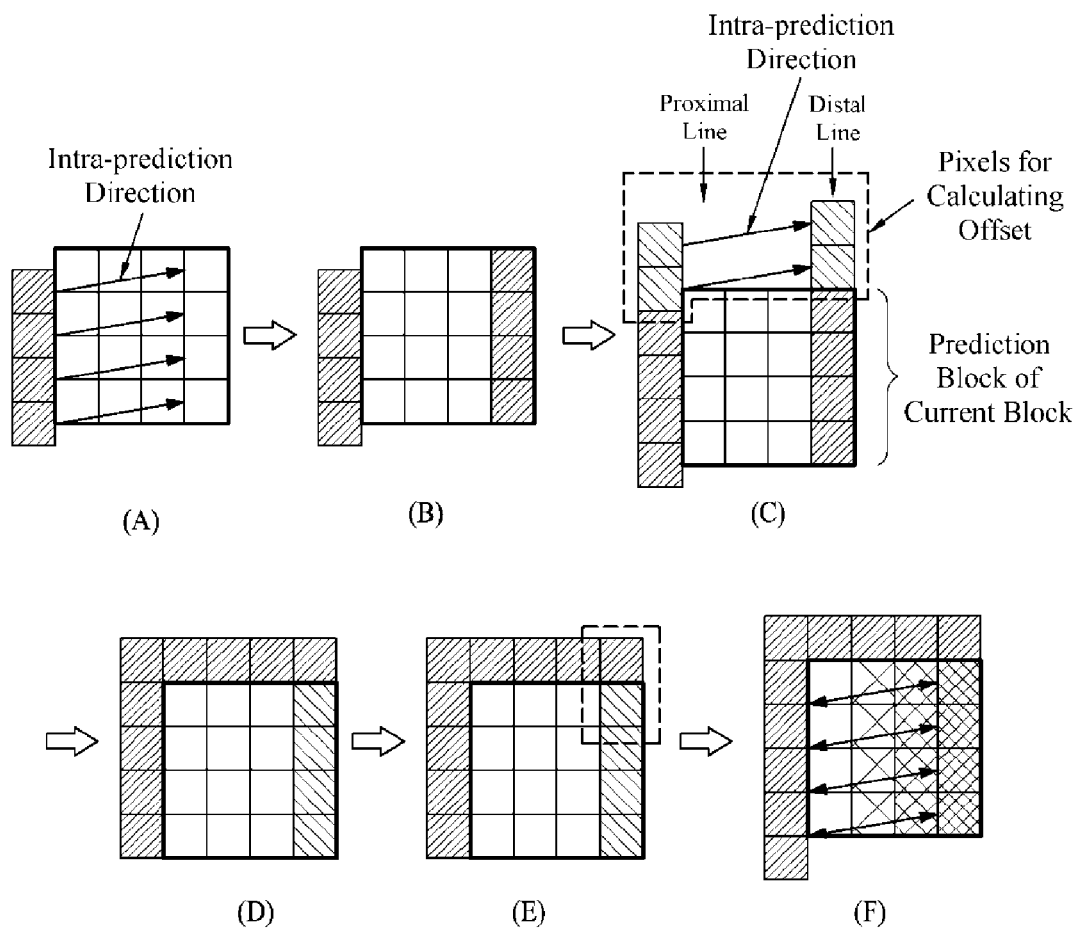
FIG. 8 is an exemplary view of a sequence of a process of carrying out a new intra prediction, in which an intra prediction direction includes an upward orientation.

FIG. 8 is an exemplary view of a sequence of a process of carrying out a new intra prediction, in which an intra prediction direction includes an upward orientation.

As shown in FIG. 8, where the intra prediction direction includes the upward orientation, the distal line of the current block becomes a right line of the current block, and the proximal line of the current block becomes the farthest line away from the distal line in the current block. Where the intra prediction direction is horizontal, the distal line and the proximal line can be defined as with the intra prediction direction including the upward orientation.

On the other hand, the prediction unit 210 can adaptively perform an intra prediction on the current block in consideration of the offset and generate a predicted block. In other words, the prediction unit 210 can select a mode having the most effective rate-distortion cost among all intra prediction modes with and without the offset considered and then intra-predictively encode the current block. That is, the prediction unit 210 can adaptively choose one of the known intra prediction method and the new intra prediction method in consideration of the rate-distortion cost. Herein, "new" is interpreted as, and referred to as, at least one of "another," "alternative," "applied," "modified," "created," and so on.

Figure 1:
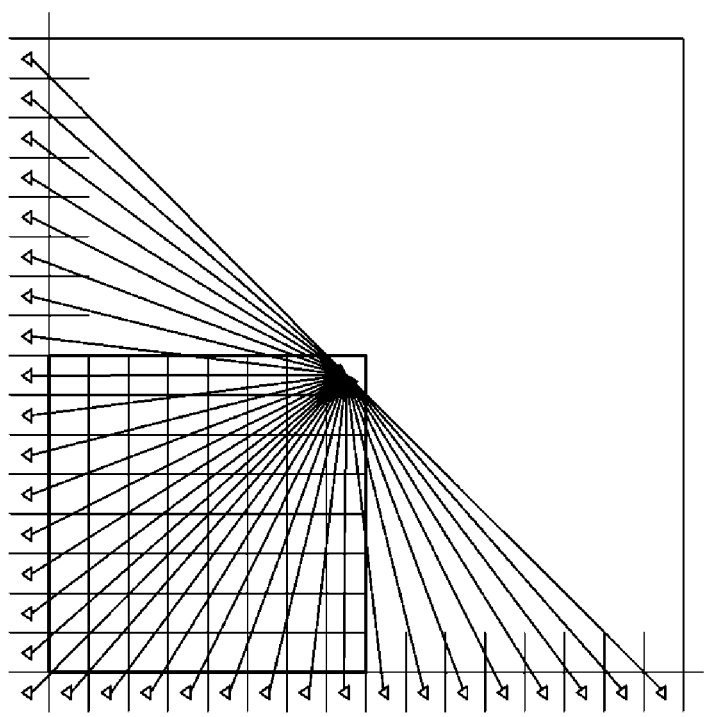
FIG. 1 is an exemplary view of intra prediction modes.

The prediction unit 210 predicts an object block (e.g., current block) to be currently encoded in a video and generates a predicted block. That is, the prediction unit 210 predicts a pixel value of each pixel of the object block to be currently encoded according to a prediction mode (e.g., the lowest cost prediction mode) determined as an optimum among the various prediction modes, and generates a predicted block with respectively predicted pixel values. Further, the prediction unit 210 transmits information on the prediction mode to the bitstream generator 260 where information on the prediction mode can be encoded. Here, among the various intra prediction modes for the intra prediction such as nine prediction modes for each of an intra 8×8 prediction and intra 4×4 prediction and four prediction modes for an intra 16×16 prediction with relation to H.264/AVC, or various prediction modes as shown in FIG. 1, the lowest cost prediction mode for encoding can be determined to be the optimum prediction mode. The prediction unit 210 calculates an encoding cost of each prediction mode by block mode or block size of the object block, and decides the lowest cost prediction mode for encoding as an optimum prediction mode.

The subtraction unit 220 subtracts a predicted block from an object block (i.e. current block) and generates a residual block. In particular, the subtraction unit 220 calculates the difference between a pixel value of each pixel for an object block to be encoded and a predicted pixel value of each pixel for a predicted block from the prediction unit 210 to generate a residual block which is a residual signal in the form of a block.

The transform unit 230 transforms the residual block with a frequency domain and also transforms each pixel value of the residual block into a frequency coefficient. Here, the transform unit 230 can transform the residual signal with the frequency domain by using various schemes such as a Hadamard transform, a discrete cosine transform based transform, and the like for transforming a video signal on a space axis into a signal on a frequency axis, in which the residual signal transformed with the frequency domain becomes a frequency coefficient.

The quantization unit 240 quantizes the residual block having the frequency coefficient transformed by the transform unit 230 with the frequency domain, and generates the quantized frequency transform block. Here, the quantization unit 240 can quantize the frequency transform block by using a dead zone uniform threshold quantization (hereinafter, referred to as DZUTQ), a quantization weighted matrix or other improved quantization methods.

The quantization coefficient adjustment unit 245 adjusts the quantization coefficient value of the quantized frequency transform block in order to reflect the kind of the method used to generate the predicted block.

The quantization coefficient adjustment unit 245 can adjust any one of quantization coefficient values so that the video decoding apparatus, as described below, recognizes the kind of the intra prediction method that was adaptively used. Accordingly, the video decoding unit can recognize the use of the new intra prediction method from an odd sum of absolute values of the quantization coefficients, and the use of the known intra prediction method from an even sum of the absolute values of the quantization coefficients. For example, where the sum of the absolute values of the quantization coefficients is 28 and the new intra prediction method was used, the quantization coefficient adjustment unit 245 adjusts the value of the quantization coefficient which gives the slightest effect on the video quality to become an odd sum of the quantization coefficient, which suggests the use of the new intra prediction.

On the contrary, the even sum of the absolute values of the quantization coefficients may be construed to represent the use of the new intra prediction method while odd sum thereof may represent the use of the known intra prediction method.

A scanning unit (not shown) scans the quantization frequency coefficient of the frequency transform block quantized by the quantization unit 240 according to various scan schemes including a zigzag scan, and generates a quantization frequency coefficient string.

The bitstream generator 260 encodes the quantization frequency coefficient string generated by the scan unit by using an entropy coding or other methods to output a bitstream. Further, the bitstream generator 260 can also encode the information on the prediction mode from predicting the object block in the prediction unit 210. On the other hand, in an implementation, the scanning unit (not shown) may be incorporated into the bitstream generator 260.

The entropy encoding technique can be used as such an encoding technique. However, it is not limited to the description, and various encoding techniques can be used. Herein, an entropy encoding is to perform entropy coding for the quantized data based on a prediction mode determined among the various prediction modes. The entropy coding indicates a lossless data compression scheme that is independent of the specific characteristics of a medium.

Further, the bitstream generator 260 can incorporate in encoded data a bit stream resulting from encoding the quantization frequency coefficients as well as various pieces of information necessary for decoding the encoded bit stream. That is, the encoded data can include a bit stream of a coded block pattern (CBP), a delta quantization parameter encoded and the quantization frequency coefficient encoded as well as a bit stream for information necessary for prediction. For example, the necessary information is an intra prediction mode in case of an intra prediction or a motion vector in case of an inter prediction.

The inverse quantization unit 270 inversely quantizes the frequency transform block quantized by the quantization unit 240. That is, the inverse quantization unit 270 carries out an inverse quantization for the quantization frequency coefficients of the quantized frequency transform block to generate a residual block having a frequency coefficient.

The inverse transform unit 280 performs an inverse transform on the frequency transform block generated by the inverse quantization unit 270, and generates a residual block, i.e. a reconstructed residual block, which has a pixel value inversely transformed from each corresponding frequency coefficient. Here, the inverse transform unit 280 can do the inverse transform by a reversed performance of the transform method used in the transform unit 230.

The addition unit 290 adds the block predicted by the prediction unit 210 to the residual block reconstructed by the inverse transform unit 280 so as to reconstruct the object block. The reconstructed object block is stored in the memory 292, and can be used as a reference picture when a block next to the object block or another future block is encoded.

Though not illustrated in FIG. 1, the deblocking filter (not shown) can be additionally connected between the memory 292 and the addition unit 290. The deblocking filter performs a deblocking filtering on the object block reconstructed by the addition unit 290. Here, the deblocking filtering refers to an operation of reducing block distortion to be generated while the video is encoded block by block, which can be performed by selectively using one of methods of applying a deblocking filter to a block boundary and a macro-block boundary, applying a deblocking filter to only a macro-block boundary, or using no deblocking filter.

Figure 9:
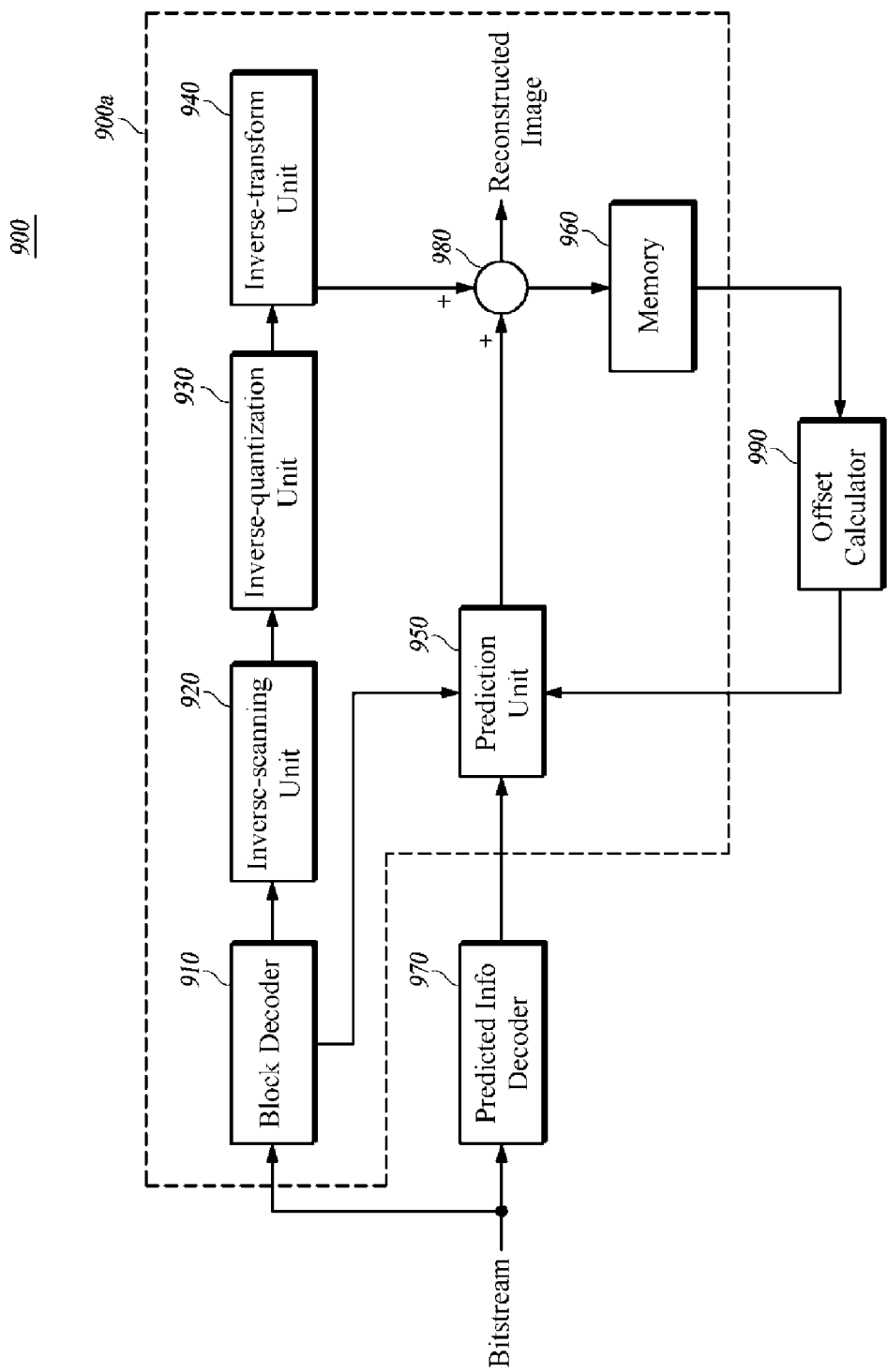
FIG. 9 is a schematic block diagram of a video decoding apparatus according to at least one embodiment of the present disclosure.

FIG. 9 is a schematic block diagram of a video decoding apparatus according to at least one embodiment of the present disclosure.

The video decoding apparatus 900 according to at least one embodiment of the present disclosure includes an intra prediction decoding unit 900a, a prediction information decoding unit 970 and an offset calculator 990. The intra prediction decoding unit 900a includes a block decoding unit 910, an inverse scan unit 920, an inverse quantization unit 930, an inverse transform unit 940, a prediction unit 950, a memory 960 and an addition unit 980. The prediction information decoding unit 970, the offset calculator 990 and other components of the intra prediction decoding unit 900a, such as the block decoding unit 910, the inverse scan unit 920, the inverse quantization unit 930, the inverse transform unit 940, and the prediction unit 950 are implemented by one or more processors and/or application-specific integrated circuits (ASICs). The intra prediction decoding unit 900a is configured to perform an intra prediction on a current block in consideration of the calculated offset so as to generate a predicted block and reconstruct the current block.

The prediction information decoding unit 970 decodes prediction information including an intra prediction mode from the bitstream.

The offset calculator 990 calculates an offset between pixels of neighboring blocks corresponding to an intra prediction direction. The offset calculator 990 selects first neighboring pixels located collinearly when viewed in the intra prediction direction with pixels in the distal line of the current block, and it also selects second neighboring pixels located in parallel with the nearest neighboring line of the current block when viewed in the direction of the intra prediction as well as in an extension line of the nearest neighboring reference pixels. Then, the offset calculator 990 calculates an offset between the first neighboring pixels and the second neighboring pixels. The offset calculator 990 performs functions identical or similar to those of the offset calculator 250 as described above with reference to FIG. 2, the detail description of which will be omitted.

The block decoding unit 910 extracts the quantized frequency coefficient string from the bitstream, which in turn transmits them to the inverse scan unit 920. The inverse scan unit 920 performs the inverse scan on the quantized frequency coefficient string according to mode information and generates a residual block with the quantized frequency coefficient. Here, the prediction information decoding unit 970 and the block decoding unit 910 may be integrally configured.

After the block decoding unit 910 performs the inverse scan according to the mode information to generate the residual block, the inverse scan unit 920 transmits the quantized frequency transform block to the inverse quantization unit 930. On the other hand, the inverse scan unit 920 may be integrated with the block decoding unit 910.

The inverse quantization unit 930 and the inverse transform unit 940 respectively perform functions identical or similar to those of the inverse quantization unit 270 and the inverse transform unit 280 as described above with reference to FIG. 2, the detail description of which will be omitted.

The prediction unit 950 performs an intra prediction on the current block in consideration of the calculated offset and generates a predicted block. The prediction unit 950 can adaptively predict the current block according to an intra prediction mode defined by determining whether a sum of an absolute value of the quantized frequency coefficients extracted from the block decoding unit 910 is either even or odd.

Further, the prediction unit 950 adaptively performs an intra prediction on the current block according to the sum of the absolute value of the extracted quantization frequency coefficients in consideration of the offset, and generates a predicted block. Where an intra prediction direction proceeds from an upper left portion to a lower right portion as shown in FIGS. 4A to 4C, the prediction unit 950 in FIG. 4A does not use a net pixel value resulting from the intra prediction as a predicted pixel value of the lowest end line which is the distal line, but generates a predicted pixel value as in FIG. 4C in consideration of an offset. That is, the prediction unit 950 can obtain a sum by adding the calculated offset to a predicted pixel value generated according to an intra prediction mode, and assign the obtained sum as a last line predicted value of a distally located line of pixel lines of the current block. In this case, to generate predicted pixel values of the remaining pixel lines excepting the distally located line of the pixel values in the current block, a bilinear interpolation can be performed with the previously decoded pixel values at the upper and left sides of the current block and the last line predicted value in order to provide a predicted block as shown in FIG. 6.

On the other hand, where the absolute value of the offset is smaller than a first threshold value, the offset is set to zero and cannot be reflected to the predicted pixel value of the lowest line which is the distal line. Here, the first threshold value can be set in various methods including $2^{Binc}$ (Binc: internal bit depth increasing) and the like.

Furthermore, where the absolute value of the offset is larger than a second threshold value, the absolute value of the offset can be restricted in order not to increase over the second threshold value. For example, the second threshold value can be set to ten.

Here, the video decoding apparatus further includes a threshold value decoding unit (not shown) for decoding information on the first threshold value and/or the second threshold value. The threshold value decoding unit can decode the information on the first threshold value and/or the second threshold value and transmit the decoded information to the prediction unit 950 so that the decoded information on the first threshold value and/or the second threshold value can be used to reflect the offset. Also, the video encoding apparatus and the video decoding apparatus may use the first and second threshold values as an appointment value and cannot separately transmit and receive information to/from each other.

As shown in FIG. 7, before the bi-linear interpolation is performed, the predicted pixel value of the distal line in which the offset is reflected and the neighboring reference pixel value can be filtered so as to calculate the predicted pixel value of the current block. That is, the predetermined number of pixels in the distal line and the reference pixels of the neighboring block adjacent to the distal line can be filtered. At this time, the reference pixels of the neighboring block to be filtered can be pixels adjacent to the current block.

As shown in FIG. 7, in order to reduce a difference between the neighboring pixel values adjacent to the current block and the pixel values of the distal line in the current block, these pixel values can be filtered. At this time, for example, the pixels to be filtered may be C and D. For example, the pixels C and D respectively are filtered into pixels B' and C' as indicated in the Equation 1, and then the pixel B' and C' can be used for the bi-linear interpolation.

As shown in FIGS. 8A to 8F, where the intra prediction direction includes an upward orientation, the distal line of the current block becomes the farthest right line of the current block, and the proximal line of the current line becomes the farthest line away from the distal line in the current block. On the other hand, where the intra prediction direction is in parallel with an upper end line of the current block, the distal line and the proximal line can be defined identically with the case in which the intra prediction direction includes the upward orientation.

The addition unit 980 adds the predicted block predicted by the prediction unit 950 to the residual block reconstructed by the inverse transform unit 940, so as to reconstruct the object block. The reconstructed object block is stored in the memory 960 and used as a reference picture when a block next to the object block or another block is reconstructed in the future.

Though not illustrated in FIG. 9, a deblocking filter (not shown) can be additionally connected between the memory 960 and the addition unit 980. The deblocking filter performs a deblocking filtering for the object block reconstructed by the addition unit 980. Here, the deblocking filtering refers to an operation of reducing a block distortion generated by encoding a video block by block, and it can be performed by selectively using one of methods of applying a deblocking filter to a block boundary and a macro-block boundary, applying a deblocking filter to only a macro-block boundary, or applying no deblocking filter.

A bitstream output terminal of the video encoding apparatus 200 in FIG. 2 is connected to a bitstream input terminal of the video decoding apparatus 900 in FIG. 9 so as to configure the video encoding /decoding apparatus according to at least one embodiment of the present disclosure.

The video encoding/decoding apparatus according to at least one embodiment of the present disclosure includes a video encoder and a video decoder. The video encoder is configured to calculate an offset between pixels of neighboring blocks which correspond to an intra prediction direction, to perform an intra prediction on a current block in consideration of the offset so as to generate a predicted block, and to intra-predictively encode the current block. The video decoder is configured to decode a predicted information which includes an intra prediction mode from a bitstream to calculate an offset between pixels of neighboring blocks which correspond to the decoded intra prediction direction, to perform an intra prediction on a current block in consideration of the offset so as to generate the predicted block, and to reconstruct the current block.

Here, the video encoding apparatus 200 according to at least one embodiment of the present disclosure can be used as the video encoder. In addition, the video decoding apparatus 900 according to at least one embodiment of the present disclosure can be used as the video decoder.

Figure 10:
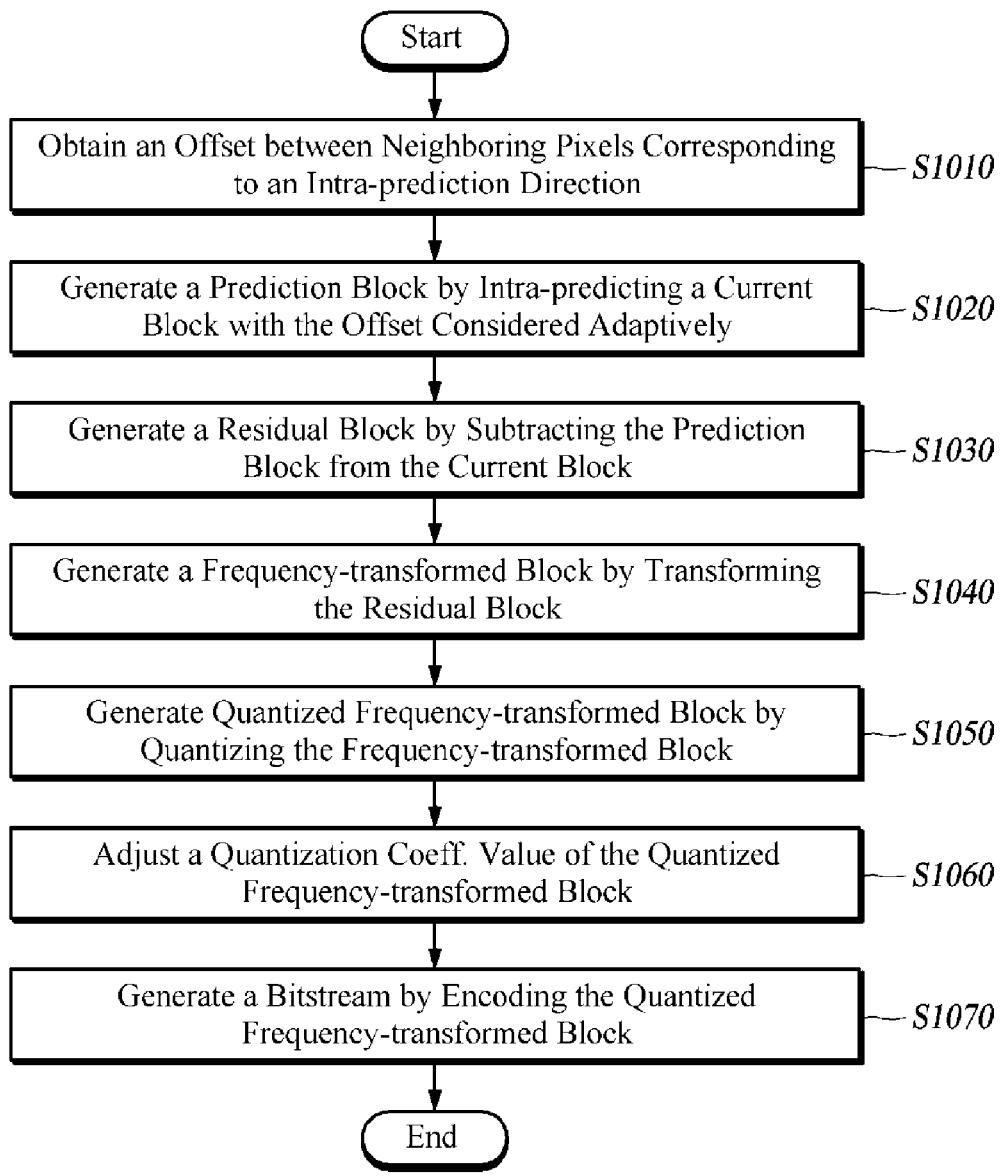
FIG. 10 is a flowchart of a method of encoding a video according to at least one embodiment of the present disclosure.

FIG. 10 is a flowchart illustrating a method of encoding a video according to at least one embodiment of the present disclosure.

The method of encoding the video according to at least one embodiment of the present disclosure includes: calculating an offset between pixels of neighboring blocks which correspond to an intra prediction direction S1010; performing an adaptive intra prediction on a current block in consideration of the offset so as to generate a predicted block S1020; subtracting the predicted block from the current block so as to generate a residual block S1030; transforming the residual block so as to generate a frequency transform block S1040; quantizing the frequency transform block so as to generate the quantized frequency transform block S1050; adjusting a value of a quantization coefficient of the quantized frequency transform block in order to reflect if the adaptive prediction block is generated S1060; and encoding the quantized frequency transform block so as to generate a bitstream S1070.

Here, the offset calculating S1010, the predicting S1020, the subtracting S1030, the transforming S1040, the quantizing S1050, the quantization coefficient adjusting S1060, and the bitstream generating S1070 respectively correspond to each operation of an offset calculator 250, a prediction unit 210, a subtraction unit 220, a transforming unit 230, a quantization unit 240, an quantization coefficient adjusting unit 245, and a bitstream generator 260. Therefore, the detail description thereof will be omitted.

Figure 11:
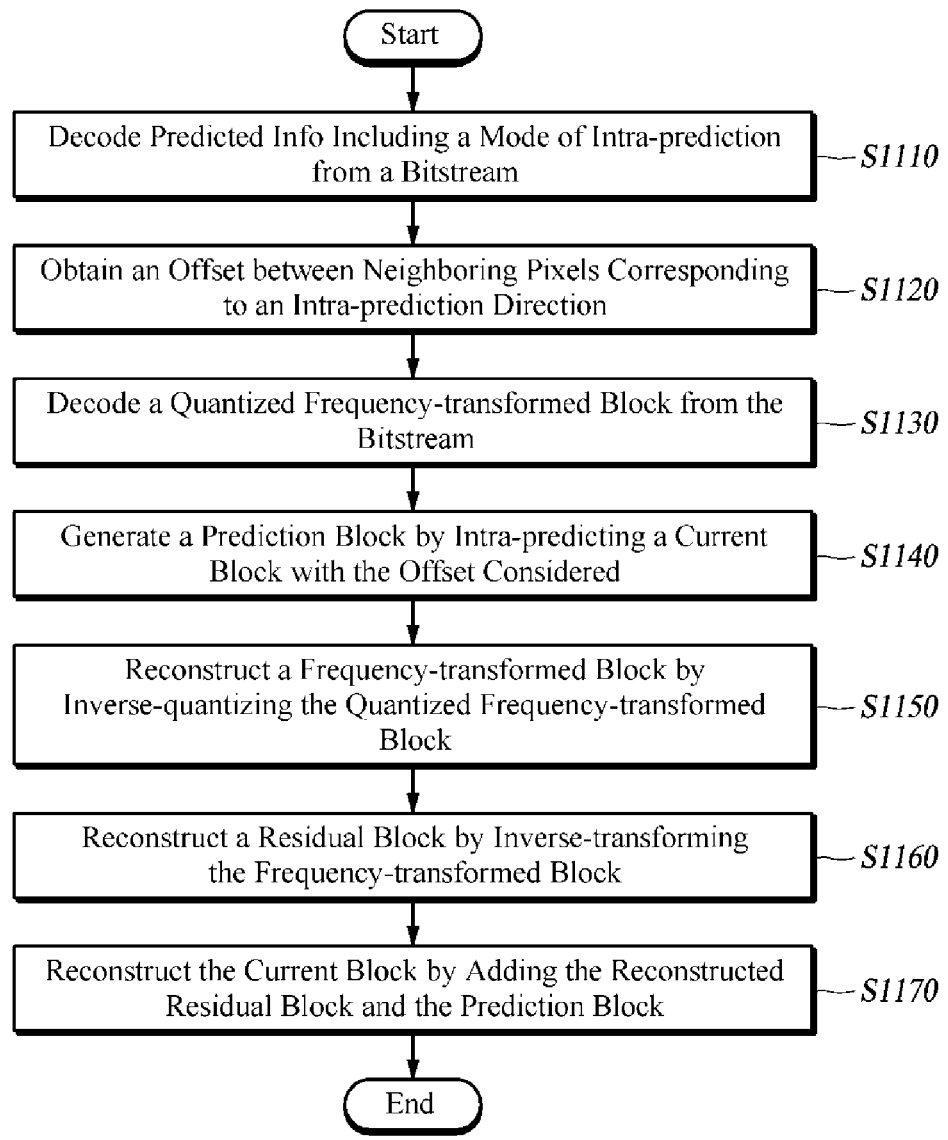
FIG. 11 is a flowchart of a method of decoding a video according to at least one embodiment of the present disclosure.

FIG. 11 is a flowchart illustrating a method of decoding a video according to at least one embodiment of the present disclosure.

The video decoding method according to at least one embodiment of the present disclosure includes steps of decoding a predicted information S1110; calculating an offset between pixels of neighboring blocks which correspond to the intra prediction direction S1120; decoding the quantized frequency transform block from the bitstream S1130; performing an intra prediction on a current block in consideration of the offset so as to generate a predicted block S1140; inversely quantizing the quantized frequency transform block so as to reconstruct the frequency transform block S1150; inversely quantizing the frequency transform block so as to reconstruct a residual block S1160; and adding the predicted block to the reconstructed residual block so as to reconstruct the current block S1170.

Here, the predicted information decoding S1110, the offset calculating S1120, the block decoding S1130, the prediction performing S1140, the inversely quantizing S1150, the inversely transforming S1160 and the adding S1170 respectively correspond to each operation of the predicted information decoder 970, the offset calculator 990, the block decoder 910, the prediction unit 950, the inverse quantization unit 930, the inverse transform unit 940 and the addition unit 980. Therefore, the detail description thereof will be omitted.

The video encoding/decoding method according to at least one embodiment of the present disclosure can be achieved by using a combination of the video encoding method according to at least one embodiment of the present disclosure and the video decoding method according to at least one embodiment of the present disclosure.

The video encoding/decoding method according to at least one embodiment of the present disclosure includes the steps of encoding a video, in which an offset between pixels of neighboring blocks corresponding to an intra prediction direction is calculated, an intra prediction for a current block is performed in consideration of the offset so as to generate a predicted block, and the current block is intra-predictively encoded; and decoding a video, in which a prediction information which includes an intra prediction mode from a bitstream is decoded, an offset of pixels between neighboring blocks which correspond to the decoded intra prediction direction is calculated, an intra prediction for a current block is performed in consideration of the offset so as to generate a predicted block, and the current block is reconstructed. The present disclosure as described above can improve the efficiency of intra prediction by adaptively using a bidirectional prediction as well as a unidirectional prediction. Further, the adaptive use of the bidirectional prediction with an adjustment made to a quantized coefficient string can transmit information of an adaptive prediction with minimized deterioration of the video quality but an additional bit to transmit, thereby achieving an efficient adaptive prediction. In addition, the present disclosure filters, before performing a bidirectional prediction, pixels of the distal line, the reference line of the bidirectional prediction and neighboring reference pixels, thereby effectively preventing the deterioration of a video quality.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

In the description above, although all of the components of the embodiments of the present disclosure may have been explained as being assembled or operatively connected as a unit, one of ordinary skill would understand the present disclosure is not limited to such embodiments. Rather, within some embodiments of the present disclosure, the respective components are selectively and operatively combined in any number of ways. Those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure are directed to illustrative purposes rather than limiting the scope of the technical idea of the present disclosure. One of ordinary skill would understand the scope of the claimed invention is not limited by the explicitly described above embodiments but by the claims and equivalents thereof.

The invention claimed is:

1. An apparatus for encoding a video by using an intra prediction mode of a current block, the apparatus comprising:
an offset calculator configured to
select at least one first neighboring pixel of one or more first neighboring blocks adjacent to the current block, the at least one first neighboring pixel being located in an extension line of a distal line of the current block, the distal line of the current block being either a lowermost pixel line of the current block or a rightmost pixel line of the current block,
select at least one second neighboring pixel of one or more second neighboring blocks adjacent to the current block, the at least one second neighboring pixel being located in an extension line of a neighboring pixel line of the current block, an inter-pixel direction from the at least one first neighboring pixel to the at least one second neighboring pixel being a direction of the intra prediction mode of the current block,
wherein the neighboring pixel line is parallel and closest to an uppermost pixel line of the current block when the distal line is the lowermost pixel line of the current block, and the neighboring pixel line is parallel and closest to a leftmost pixel line of the current block when the distal line is the rightmost pixel line of the current block, and
calculate an offset between the at least one first neighboring pixel and the at least one second neighboring pixel; and
a prediction unit configured to adaptively perform an intra prediction on the current block based on the calculated offset so as to generate a predicted block of the current block,
wherein the intra prediction mode of the current block is selected from a plurality of intra prediction modes.

2. The apparatus of claim 1, further comprising:
a subtraction unit configured to subtract the predicted block from the current block so as to generate a residual block;
a transform unit configured to transform the residual block so as to generate a frequency transform block;
a quantization unit configured to quantize the frequency transform block so as to generate a quantized frequency transform block;
a quantization coefficient adjustment unit configured to make an adjustment to a value of a quantization coefficient of the quantized frequency transform block based on a method used to generate the predicted block; and
a bitstream generator configured to generate a bitstream by encoding the quantized frequency transform block.

3. The apparatus of claim 1, wherein the at least one first neighboring pixel shares a border of the current block with the distal line of the current block.

4. The apparatus of claim 1, wherein the calculated offset is an average difference between the at least one first neighboring pixel and the at least one second neighboring pixel.

5. The apparatus of claim 1, wherein
the number of the at least one first neighboring pixel is half a length of a side of the current block, and
the number of the at least one second neighboring pixel is half the length of the side of the current block.

6. An apparatus for decoding a video, comprising:
a prediction information decoding unit configured to decode an intra prediction mode of a current block from a bitstream, the intra prediction mode of the current block being selected from among a plurality of intra prediction modes;
an offset calculator configured to
select at least one first neighboring pixel of one or more first neighboring blocks adjacent to the current block, the at least one first neighboring pixel being located in an extension line of a distal line of the current block, the distal line of the current block being either a lowermost pixel line of the current block or a rightmost pixel line of the current block,
select at least one second neighboring pixel of one or more second neighboring blocks adjacent to the current block, the at least one second neighboring pixel being located in an extension line of a neighboring pixel line of the current block,
wherein the neighboring pixel line is parallel and closest to an uppermost pixel line of the current block when the distal line is the lowermost pixel line of the current block, and the neighboring pixel line is parallel and closest to a leftmost pixel line of the current block when the distal line is the rightmost pixel line of the current block, and
calculate an offset between the at least one first neighboring pixel and the at least one second neighboring pixel, an inter-pixel direction from the at least one first neighboring pixel to the at least one second neighboring pixel being a direction of the intra prediction mode of the current block; and
an intra prediction decoding unit configured to perform an intra prediction on the current block based on the calculated offset so as to generate a predicted block of the current block and reconstruct the current block by using the predicted block.

7. The apparatus of claim 6, wherein the at least one first neighboring pixel shares a border of the current block with the current block.

8. The apparatus of claim 6, wherein the calculated offset is an average difference between the at least one first neighboring pixel and the at least one second neighboring pixel.

9. The apparatus of claim 6, wherein
the number of the at least one first neighboring pixel is half a length of a side of the current block, and the number of the at least one second neighboring pixel is half the length of the side of the current block.

10. The apparatus of claim 6, wherein the intra prediction decoding unit is configured to generate the predicted block by
generating a predicted value of a pixel in the distal line of the current block by performing the intra prediction on the current block,
generating a sum by adding the offset to the predicted pixel value, and
generating predicted pixel values of remaining pixel lines of the current block excepting the distal line of the current block by performing a bi-linear interpolation by using the sum and pixels in the neighboring pixel line.

11. The apparatus of claim 6, wherein the intra prediction decoding unit is configured to generate the predicted block by
generating a predicted value of a pixel in the distal line of the current block by performing the intra prediction on the current block,
generating a sum by adding the offset to the predicted pixel value,
subsequently filtering values of a predetermined number of pixels in the distal line or values of a predetermined number of pixels adjacent to the current block, the pixels adjacent to the current block being used to perform the intra prediction, and
generating predicted pixel values of remaining pixel lines of the current block other than the distal line of the current block by performing a bi-linear interpolation by using the sum and pixels in the neighboring pixel line.

12. The video decoding apparatus of claim 6, wherein the intra prediction decoding unit comprises:
a block decoder configured to decode a quantized frequency transform block from the bitstream;
a prediction unit configured to perform the intra prediction on the current block to generate the predicted block;
an inverse quantization unit configured to inversely quantize the quantized frequency transform block so as to reconstruct a frequency transform block;
an inverse transform unit configured to inversely transform the frequency transform block so as to reconstruct a residual block; and
an addition unit configured to add the reconstructed residual block to the predicted block so as to reconstruct the current block.

13. A method of encoding a video performed by an apparatus for encoding a video by using an intra prediction mode of a current block, the method comprising:
selecting at least one first neighboring pixel of one or more first neighboring blocks adjacent to the current block, the at least one first neighboring pixel being located in an extension line of a distal line of the current block, the distal line of the current block being either a lowermost pixel line of the current block or a rightmost pixel line of the current block;
select at least one second neighboring pixel of one or more second neighboring blocks adjacent to the current block, the at least one second neighboring pixel being located in an extension line of a neighboring pixel line of the current block,
wherein the neighboring pixel line is parallel and closest to an uppermost pixel line of the current block when the distal line is the lowermost pixel line of the current block, and the neighboring pixel line is parallel and closest to a leftmost pixel line of the current block when the distal line is the rightmost pixel line of the current block;
calculating an offset between the at least one first neighboring pixel and the at least one second neighboring pixel, an inter-pixel direction from the at least one first neighboring pixel to the at least one second neighboring pixel being a direction of the intra prediction mode of the current block; and
adaptively performing an intra prediction on the current block based on the calculated offset so as to generate a predicted block of the current block,
wherein the intra prediction mode of the current block is selected from a plurality of intra prediction modes.

14. A method of decoding a video performed by an apparatus for decoding a video, the method comprising:
decoding an intra prediction mode of a current block from a bitstream, the intra prediction mode of the current block being selected from among a plurality of intra prediction modes;
selecting at least one first neighboring pixel of one or more first neighboring blocks adjacent to the current block, the at least one first neighboring pixel being located in an extension line of a distal line of the current block, the distal line of the current block being either a lowermost pixel line of the current block or a rightmost pixel line of the current block;
selecting at least one second neighboring pixel of one or more second neighboring blocks adjacent to the current block, the at least one second neighboring pixel being located in an extension line of a neighboring pixel line of the current block,
wherein the neighboring pixel line is parallel and closest to an uppermost pixel line of the current block when the distal line is the lowermost pixel line of the current block, and the neighboring pixel line is parallel and closest to a leftmost pixel line of the current block when the distal line is the rightmost pixel line of the current block;
calculating an offset between the at least one first neighboring pixel and the at least one second neighboring pixel, an inter-pixel direction from the at least one first neighboring pixel to the at least one second neighboring pixel being a direction of the intra prediction mode of the current block; and
performing an intra prediction on the current block based on the calculated offset so as to generate a predicted block of the current block and to reconstruct the current block by using the predicted block.

* * * * *